(12) United States Patent
Dean (10) Patent No.: US 9,918,423 B2
(45) Date of Patent: Mar. 20, 2018

(54) APPARATUS TO MOVE IN TOW FARM IMPLEMENTS

(71) Applicant: Walter Dean, Alpharetta, GA (US)

(72) Inventor: Walter Dean, Alpharetta, GA (US)

( * ) Notice: Subject to any disclaimer, the term of this patent is extended or adjusted under 35 U.S.C. 154(b) by 0 days.

(21) Appl. No.: 15/330,943

(22) Filed: Aug. 10, 2015

(65) Prior Publication Data

US 2017/0181365 A1    Jun. 29, 2017

Related U.S. Application Data (63) Continuation-in-part of application No. 13/694,474, filed on Dec. 5, 2012, now abandoned.

(51) Int. Cl.
| | |
|---|---|
| *A01B 63/14* | (2006.01) |
| *A01B 59/02* | (2006.01) |
| *A01B 63/00* | (2006.01) |
| *A01B 69/00* | (2006.01) |

(52) U.S. Cl.
CPC .............. *A01B 63/14* (2013.01); *A01B 59/02* (2013.01); *A01B 63/008* (2013.01); *A01B 69/007* (2013.01)

(58) Field of Classification Search
CPC ................................ A01B 59/02; A01B 63/14
USPC .................................................. 172/257, 438
See application file for complete search history.

(56) References Cited

U.S. PATENT DOCUMENTS

| | | | | |
|---|---|---|---|---|
| 1,422,985 A | * | 7/1922 | Johnston et al. ...... | A01B 39/06 172/257 |
| 1,428,947 A | * | 9/1922 | Dickinson ................ | A01B 3/46 111/200 |
| 1,871,026 A | * | 8/1932 | Belli ....................... | A01B 39/18 172/112 |
| 4,051,915 A | * | 10/1977 | Behrens ................. | B60K 28/00 180/271 |
| 4,424,868 A | * | 1/1984 | Staniforth et al. ..... | A01B 45/02 172/21 |
| 4,759,417 A | * | 7/1988 | Wanie et al. .......... | B60K 20/00 180/273 |
| 7,878,261 B2 | * | 2/2011 | Masumoto ............ | E02F 9/2004 172/321 |

* cited by examiner

*Primary Examiner* — Thomas B Will
*Assistant Examiner* — Joel F. Mitchell
(74) *Attorney, Agent, or Firm* — Richard C. McComas (57) ABSTRACT

An apparatus to move in-tow at least one farm implement. The apparatus is an elongated rectangular member that has a first end and a second end opposite the first end. A movement transfer mechanism is connected between the elongated rectangular member's first end and the farm implement. The apparatus has a first wheel mounted on one side of the elongated rectangular member's first end and a second wheel mounted on the other side of the elongated rectangular member's first end. A third rotatable wheel is mounted adjacent to the second end of the elongated rectangular member. The wheels may, if desired, be ground engaging wheels.

1 Claim, 8 Drawing Sheets

APPARATUS TO MOVE IN TOW FARM IMPLEMENTS

This is a continuation in-part of co-pending patent application Ser. No. 13/694,474 filed on Dec. 5, 2012

BACKGROUND OF THE INVENTION

Modern farm machinery is generally fueled by gasoline or diesel. The availability and price of gasoline or diesel does not present a problem for farmers in developed countries. The availability of farm equipment such as tractors and farm implements in less developed countries, e.g.; Africa and Central America, it a very big obstacle. Often these countries lack the infrastructure to transport fuel to the farms located in rural areas. The type of farming done in these areas is limited to traditional farming i.e., a one bladed plow that is pulled by a farm animal and the availability of capitol and credit in these areas.

The farmer's productivity is low and the farm plots are small because they are subject to adverse conditions mainly poverty, weather and the farming season is relatively short due to the rainy season. The only way a farmer can increase his productivity is to work longer hours. It would be desirable to have an apparatus that is not powered by fuel and has a plurality of plow blades so that a farmer can increase his productivity. Other possibilities of such an apparatus to move in-tow farm implements like this are endless.

SUMMARY OF THE INVENTION

The present invention is an apparatus to move in-tow at least one farm implement. The apparatus is an elongated rectangular member that has a first end and a second end opposite the first end. A movement transfer mechanism is connected between the elongated rectangular member's first end and the farm implement. The apparatus has a first wheel mounted on one side of the elongated rectangular member's first end and a second wheel mounted on the other side of the elongated rectangular member's first end. A third wheel is mounted adjacent to the second end of the elongated rectangular member. The wheels may, if desired, be ground engaging wheels.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Before describing in detail the particular improved apparatus to move in-tow farm implements in accordance with the present invention, it should be observed that the invention resides primarily in the novel structural combination of conventional mechanical components and in the particular detailed configuration thereof. Accordingly, the apparatus arrangement has, for the most part, been illustrated in the drawings by readily understandable schematic diagrams. The drawings illustrate only those specific details that are pertinent to the present invention in order not to obscure the disclosure with structural details which will be readily apparent to those skilled in the art having the benefit of the description herein.

Figure 1:
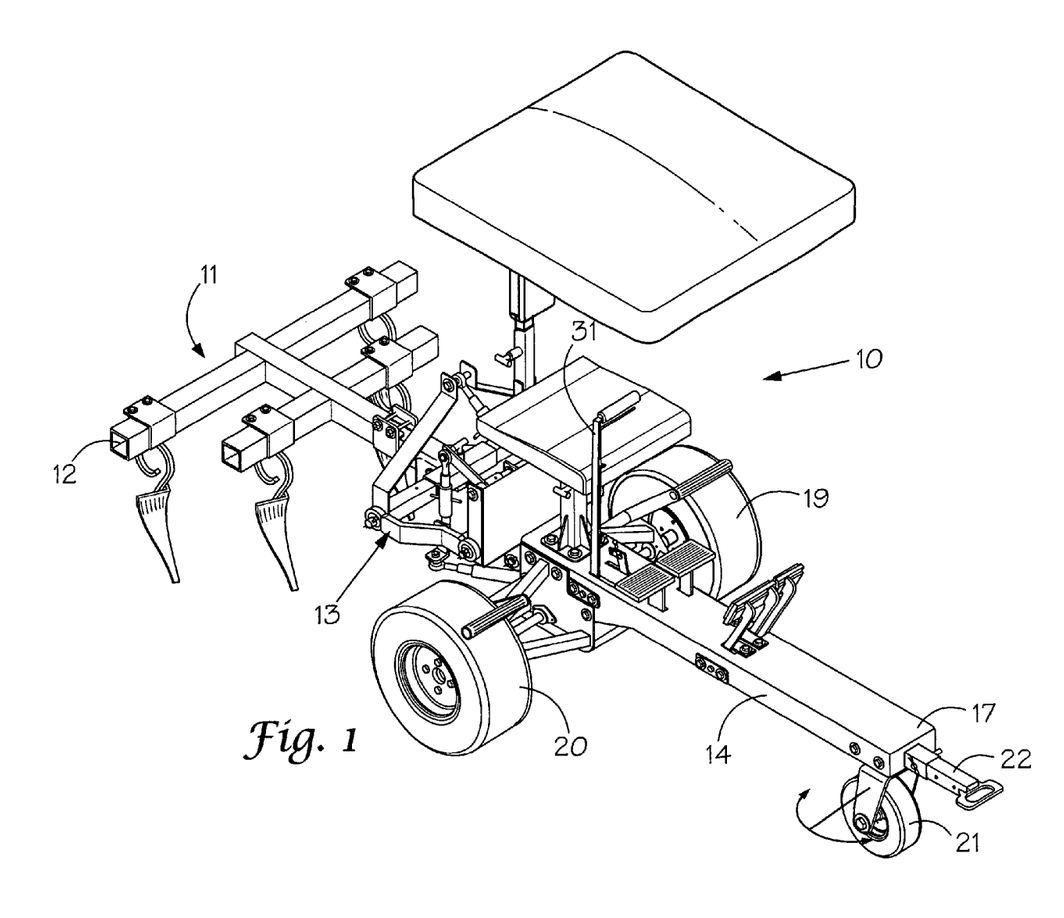
FIG. 1 illustrates a top-level schematic diagram view of an apparatus to move in-tow farm implements.

The present invention 10, FIG. 1 is an apparatus to move in-tow at least one farm implement 11. The apparatus 10 is an elongated rectangular member 14 that has a first end 16 and a second end 17 opposite the first end 16. A movement transfer mechanism 13 is connected between the elongated rectangular member's 14 first end 16 and the farm implement 12. The apparatus 10 has a first wheel 19 mounted on one side of the elongated rectangular member's 14 first end 16 and a second wheel 20 mounted on the other side of the elongated rectangular member's 14 first end 16. A third wheel 21 is mounted adjacent the second end 17 of the elongated rectangular member 14. Wheel 21 swivels about the center pivot point of end 17 of the elongated rectangular member 14. The unexpected result of having wheel 21 swivel is to prevent the apparatus 10 from turning over when turning a corner. The swiveling is not aided by the operator of the apparatus. The wheels 19, 20 and 21 may, if desired, be ground engaging wheels.

An adjustable towing hitch 22 is mounted at the elongated rectangular member's 14 second end 17. A first towing hitch 22 may, if desired, have an aperture that functions as a securing point for at least one animal of sufficient size to pull the apparatus 10. An example of an animal of sufficient size is an ox.

The farm implement 11, FIG. 1 is connected to a movement transfer mechanism 13 that is connected to a first end 16, of the elongated substantially rectangular member 14. The movement transfer mechanism 13 has an upright member 15 connected to a pivotal crossbar 18, FIG. 2. The pivotal crossbar 18 is connected to a second hitch 23 that is the connection point for the farm implement 12. The movement transfer mechanism 13 has a plurality of turnbuckles 25, 26, 27 and 28, FIG. 4 that set the maximum and minimum range of pivot the crossbar 18, FIG. 2 may move. The turnbuckle 28 sets the maximum and minimum range of side to side movement of the crossbar 18, FIG. 2.

Figure 4:
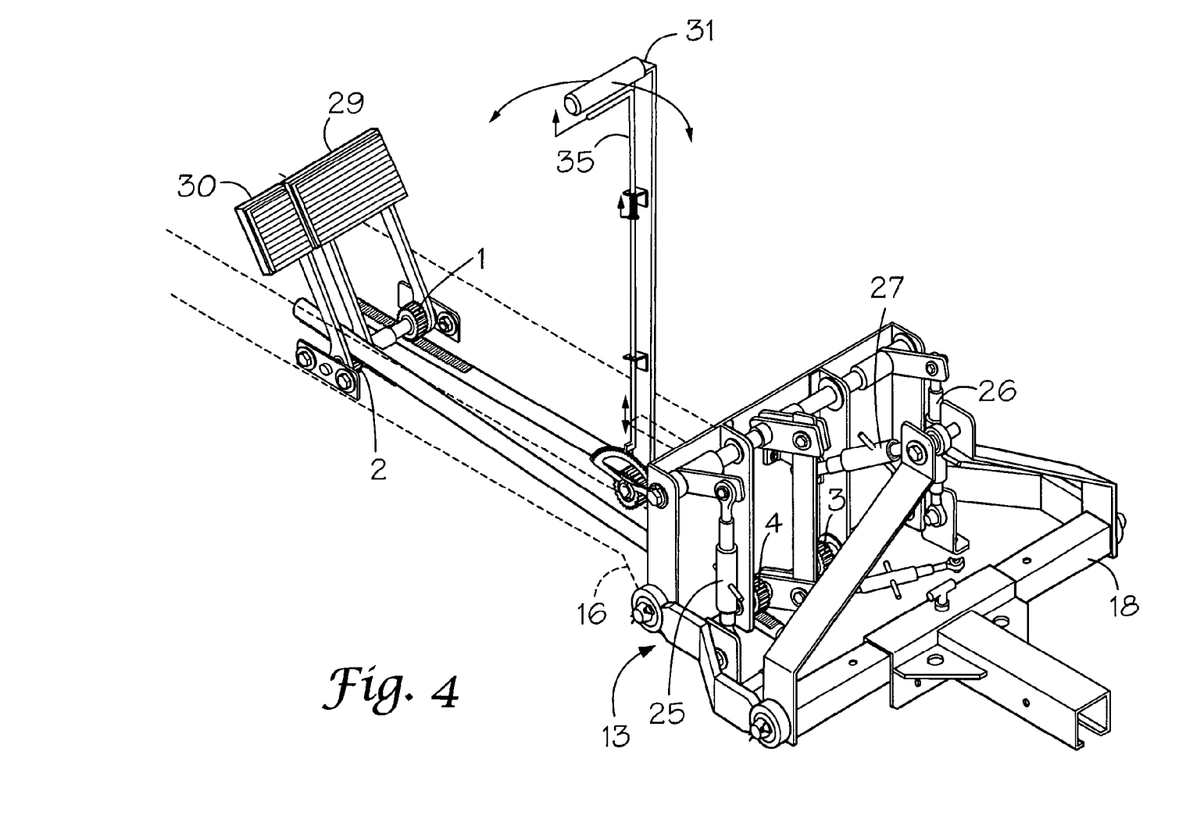
FIG. 4 illustrates a top-level schematic diagram view of an elongated rectangular member of FIG. 1, with a lifting mechanism and a lifting assist lever.
Figure 5:
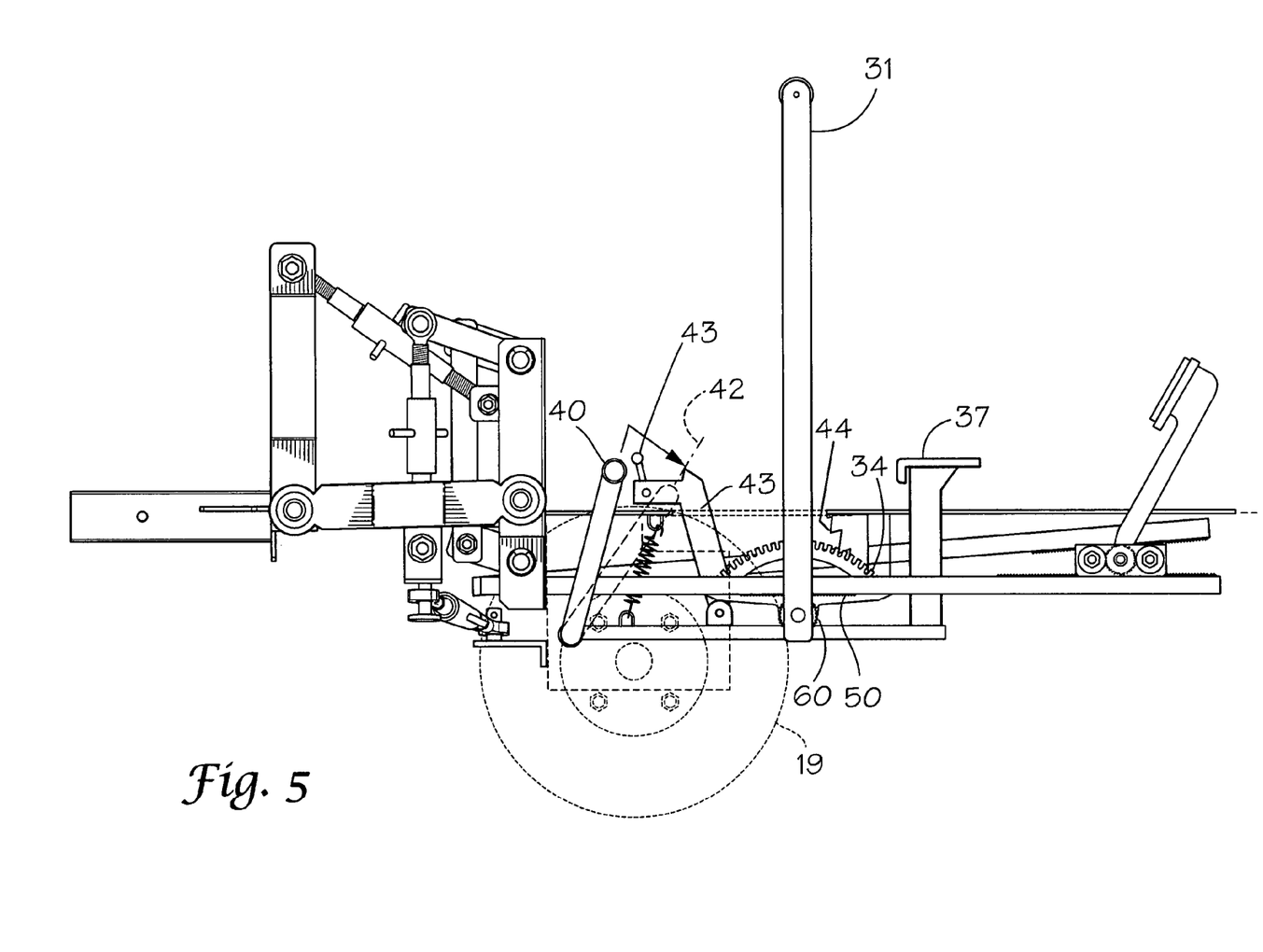
FIG. 5 illustrates a top-level schematic diagram side view of an elongated rectangular member of FIGS. 3 and 4 with the lifting mechanism assist lever and the controls for the braking mechanism.

The movement transfer mechanism 13, FIG. 4 has a pair of pedals 29 and 30 adjacently spaced from the elongated rectangular member's 14 first end 16. The pair of pedals 29 and 30 are connected to the movement transfer mechanism 13 a via pair of cogs 1 and 2 engaging the teeth portion 50, FIG. 2 of a pair of elongated rods 32 and 33 FIG. 2 respectively. Depressing pedal 30, connected to rod 32, lowers the movement transfer mechanism 13 to its maximum range set by the turnbuckles 25 and 26. Depressing pedal 29, connected to rod 33 via cog 1, raises the movement transfer mechanism 13 to its minimum range set by the turnbuckle 27. A first elongated L-shaped assist lever 31 is connected to rod 33 via cog 60 and to a ratchet 34, FIG. 5, 7A and 7B. The cog 60 engages the teeth 50 of the elongated rod 33 lifting the movement transfer mechanism 13. The ratchet 34 assists the upwards movement of the movement transfer mechanism 13. The ratchet 34 sets and holds the movement transfer mechanism 13, and by extension the farm implement 11, in a selected position via a second elongated L-shaped member 35, FIG. 2. The second elongated L-shaped member 35 is movably disposed to the first elongated L-shaped assist lever member 31.

Figure 7A:
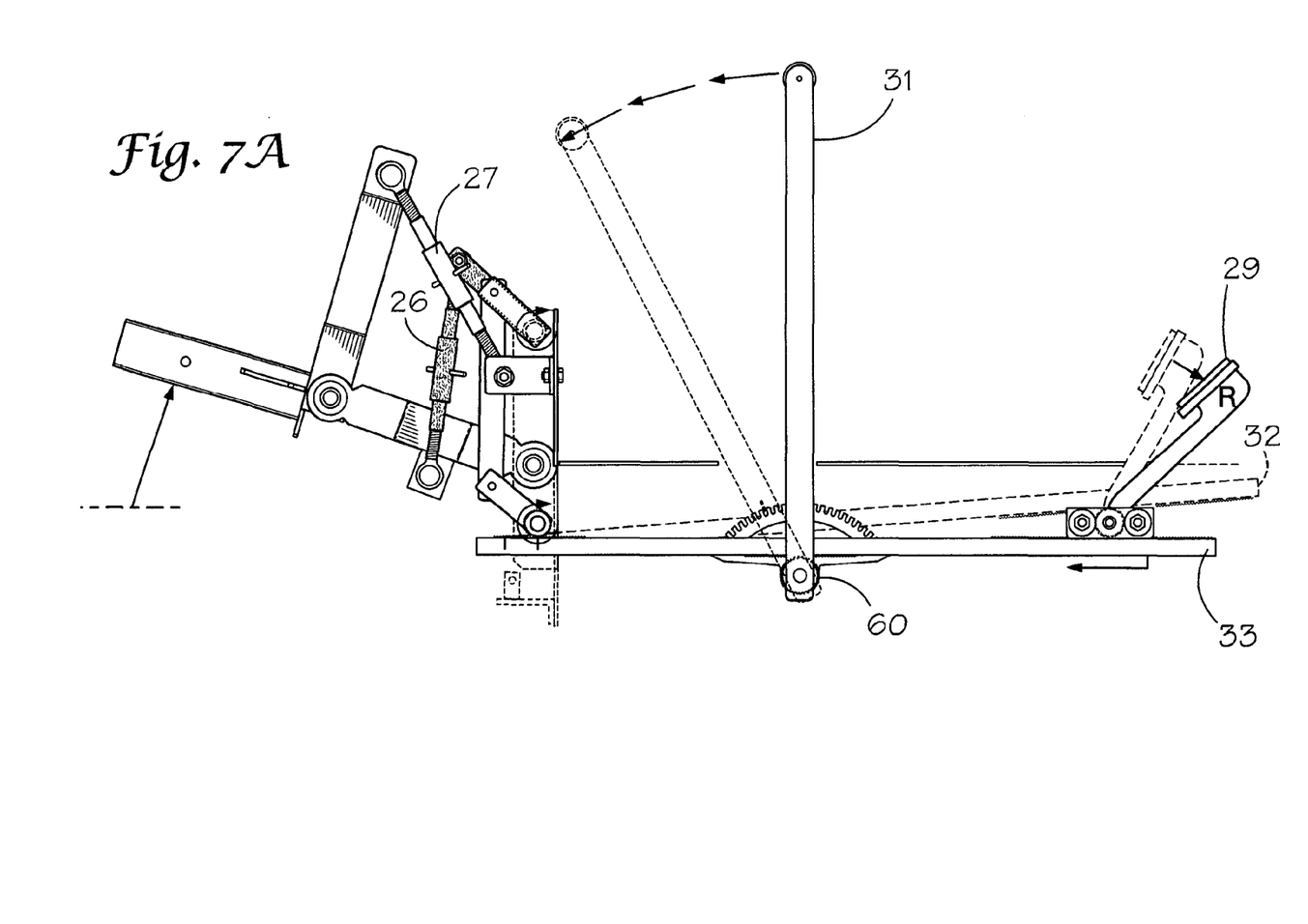
FIG. 7A illustrates a schematic diagram side view in a first position with the movement transfer mechanism in the up position and FIG. 7B illustrates a schematic diagram side view in a second position with the movement transfer mechanism in the down position.
Figure 7B:
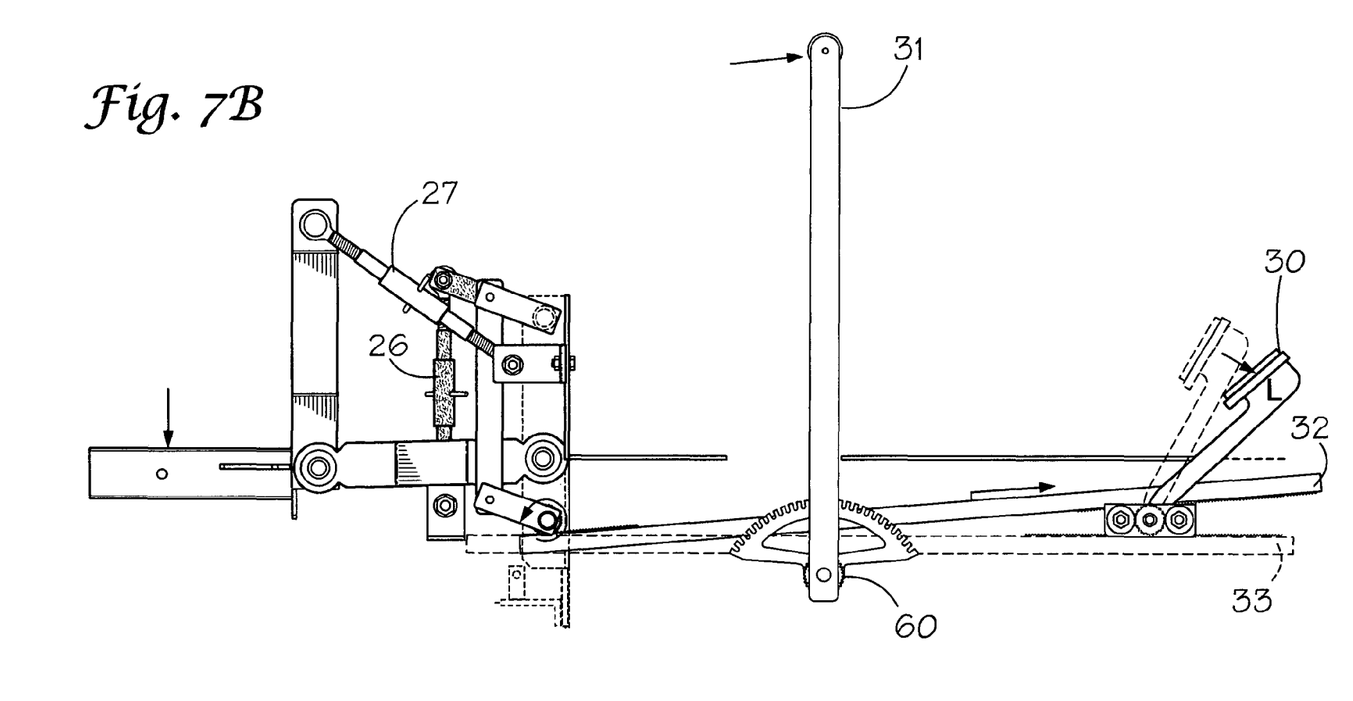

The first elongated L-shaped assist lever member 31, FIG. 7B has a first position all the way forward towards the second end 17 of the elongated rectangular member 14. The first position places the movement transfer mechanism 13 to its maximum range by turnbuckles 26 and 27 i.e., the farm implement 11 is resting on the ground. The first elongated L-shaped assist lever member 31, FIG. A has a second position all the way back towards the first end 16 of the elongated rectangular member 14. When the pedal 29 is depressed the first elongated L-shaped assist lever member 31 may, if desired, be moved from the first position towards the second position thereby assisting to lift of the movement transfer mechanism 13 from its maximum position to its minimum position. The movement transfer mechanism 13 may, if desired, be locked in place by the second elongated L-shaped assist lever member 35.

Figure 3:
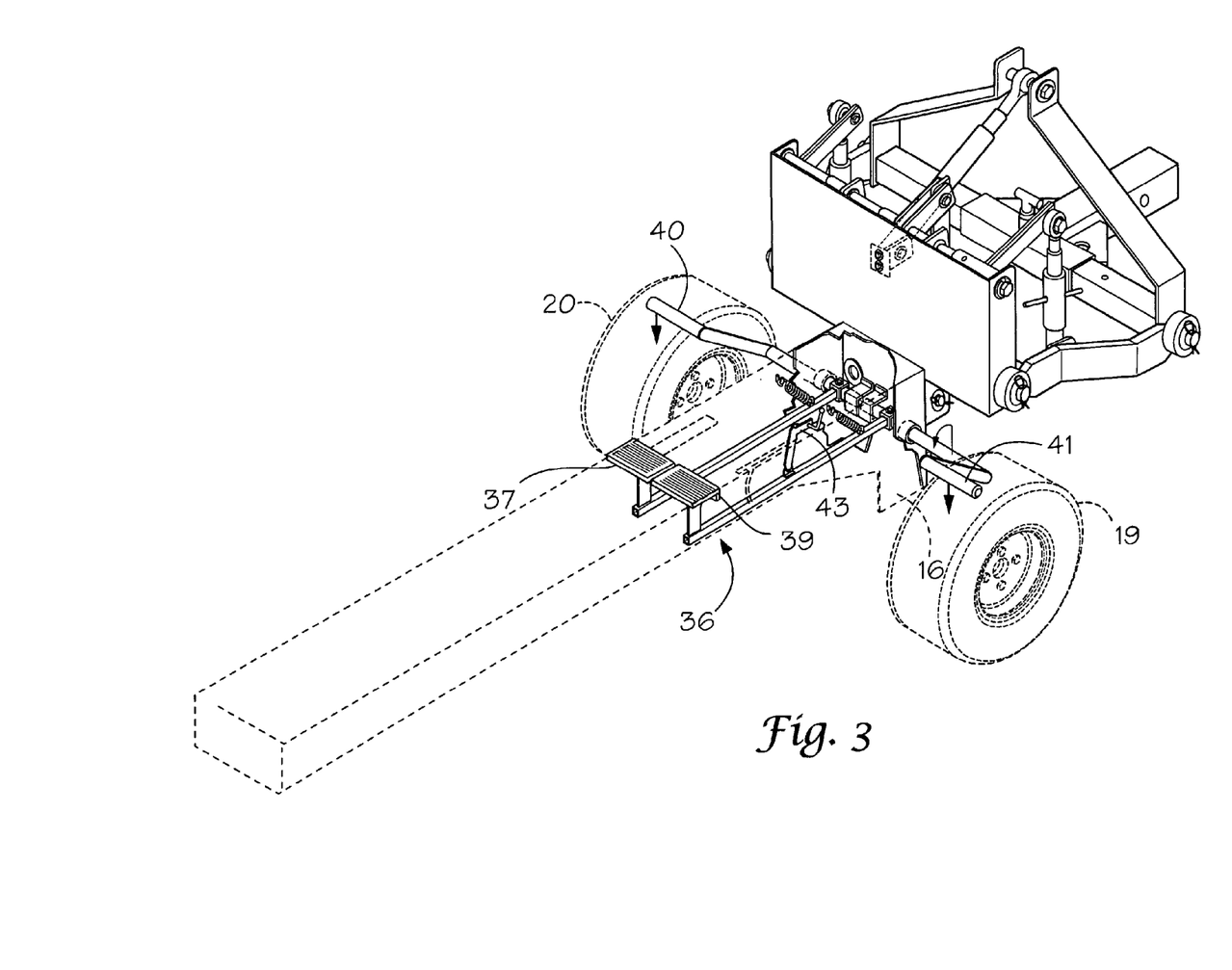
FIG. 3 illustrates a top-level schematic diagram view of an elongated rectangular member of FIG. 1 with a braking mechanism that controls the directional movement of the apparatus.

A braking mechanism 36, FIG. 3 controls the directional movement of the apparatus 10. The braking mechanism 36 has two pedals 37 and 39 and a rectangular brake latch bar 43 that is adjacently spaced from the elongated rectangular member's 14 second end 17. When the apparatus 10 is stationary pedal 39 may, if desired, be depressed and the rectangular brake latch bar 43 may, if desired, be urged forward engaging one of a plurality of notches 44, FIG. 5. This action will lock wheel 19 in place via elongated rod 41. To release wheel 19, pedal 39 is depressed and the brake latch bar 43 is urged rearward disengaging it from the notches 44 therefore releasing wheel 19. The pedal 37 is connected to an elongated rod 40 that is juxtaposition wheel 20. When the apparatus is active and pedal 37 is depressed the elongated rod 40 moves downward to engage wheel 20. The pressure of the elongated rod 40 on wheel 20 stops the forward movement of the apparatus 10 and turns the apparatus 10 to the right. Pedal 39 is connected to an elongated rod 41 that is juxtaposition wheel 19. When the pedal 39, FIG. 3 is depressed the elongated rod 41 moves downward 42, FIG. 5 to engage wheel 19 and stop the forward movement of the apparatus 10 and turns the apparatus 10 to the left.

The apparatus 10 may, if desired, be manufactured out of sheet steel, rigid plastic, aluminum or any other convenient material that is sufficiently rigid to tow farm implements and to be towed by something other than machinery. The farm implements may, if desired, be a plow 12, a disk or a plurality of different farm implements.

Figure 6:
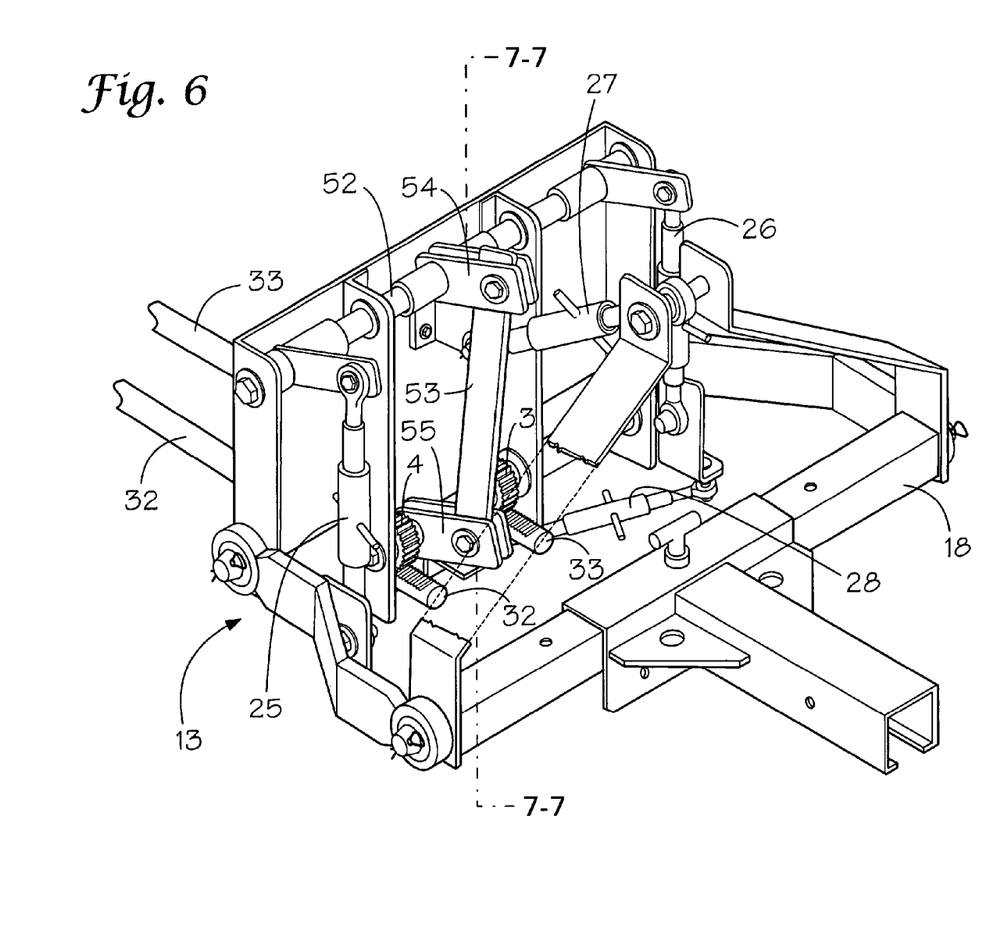
FIG. 6 illustrates a top-level schematic diagram perspective view of a movement transfer mechanism with cutaway.

In operation: The present invention 10, FIG. 1 is an elongated substantially rectangular member that has a first end and a second end oppositely disposed from the first end, the first end is connected to a pair of wheels. A pair of pedals is adjacently spaced from the second end, one of the pedals 29, FIG. 7A controls the upward movement of the farm implements. The other pedal 30, FIG. 7B controls the downward movement of the farm implements 11. The movement transfer mechanism 13 is connected between the pair of pedals 29 and 30 respectively and the farm implements 11. A plurality of turnbuckles 25, 26, 27, 28, FIG. 6 are inter-connected to the movement transfer mechanism 13 to stabilize the movement of the mechanism when in operation. The upward movement lifts the farm implements via the movement transfer mechanism 13. The downward movement lowers the farm implements via the movement transfer mechanism 13.

Figure 2:
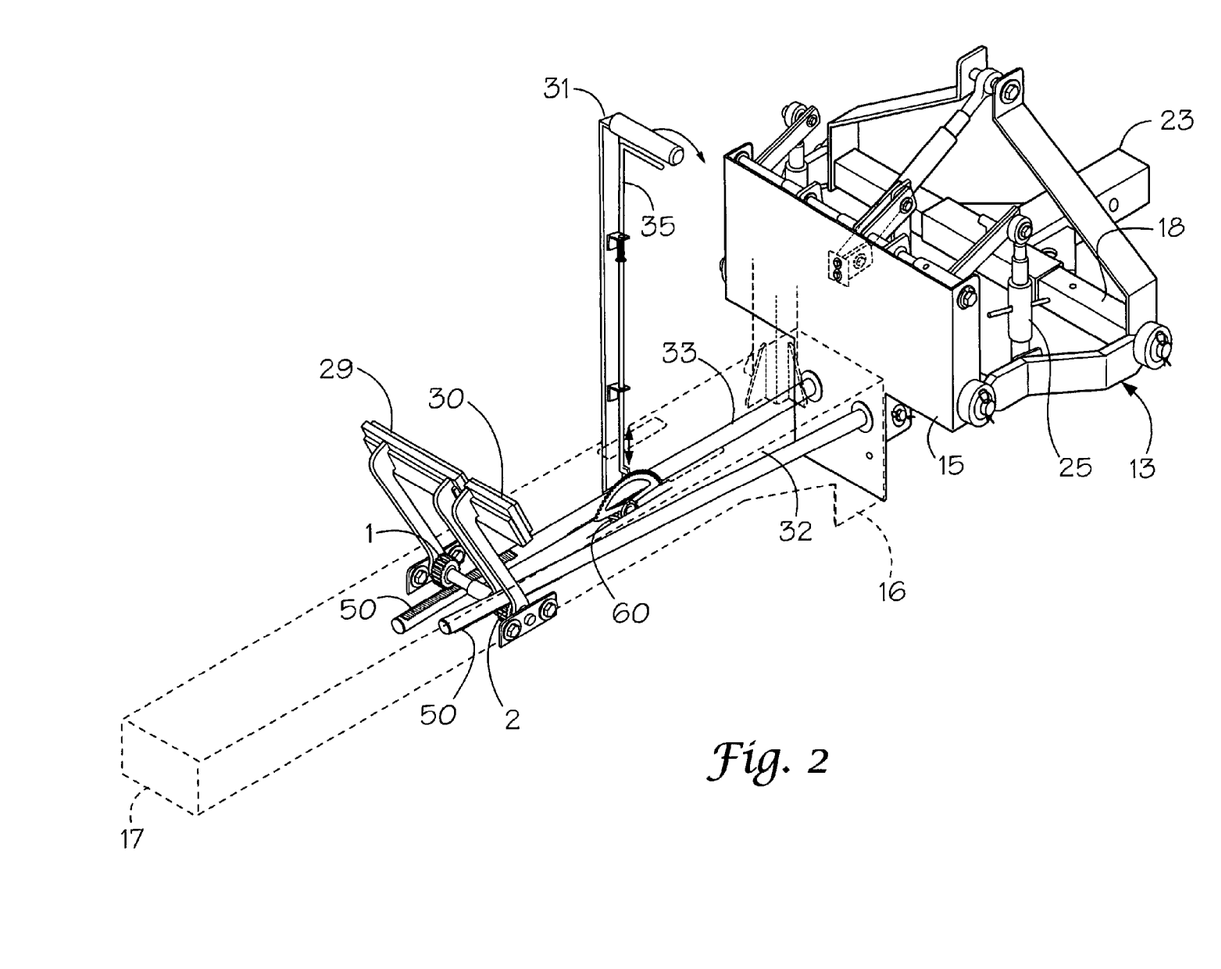
FIG. 2 illustrates a top-level schematic diagram view of an elongated rectangular member of FIG. 1 with a lifting and lowering mechanism.

A pair of elongated rods 32 and 33, FIG. 2, have a selected number of teeth 50 along each end. The selectable teeth ratio is in the range of about 1:1 to 1:3. The pair of elongated rods 32 and 33 have an upper and lower portion along the longitudinal length of the rods. The pair of elongated rods are connected within the elongated substantially rectangular member 14. A first cog 1, FIG. 2 with selectable teeth ratio in the range of 1:1 to 1:3 is mounted on the pedal 29 that controls the upward movement of farm implements. The first cog 1 has a lower portion engaging the teeth of one of the rod's 33 upper portion. A second cog 2, FIG. 2 with selectable teeth ratio in the range of 1:1 to 1:3 is mounted on the pedal 30 that controls the downward movement of farm implement. The second cog 2 has an upper portion engaging the teeth of the rod's 32 lower portion.

A -C-shaped member 53, FIG. 6 has upper 54 and lower 55 pivotal end points. The upper 54 pivotal end point is connected to a cross bar 52 positioned along the top portion of the movement transfer mechanism 13. A third cog 3 and a fourth cog 4 have bottom portions that are rotatively disposed on either side of the -C-shaped member's lower pivotal end point 55. The third cog's bottom portion engages the teeth of the rod that connects to the pedal that controls the upward movement of the farm implements. The fourth cog's bottom portion engages the teeth of the rod that connects to the pedal that controls the downward movement of the farm implements. When the pedal that controls the upward movement of the movement transfer mechanism is urged forward the first cog rotates. The first rod 33 traverses rearward and the -C-shaped member 53 pivots upward lifting the movement transfer mechanism.

The fourth cog's bottom portion engages the teeth of the rod that connects to the pedal that controls the downward movement of the farm implements. When the pedal that controls the downward movement of the movement transfer mechanism is urged forward the fourth cog rotates. The second rod 32 traverses forward and the -C-shaped member 53 pivots downward lowering the movement transfer mechanism.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. A means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:
1. Apparatus to move in-tow farm implements comprising:
   a) an elongated substantially rectangular member having a first end and a second end oppositely disposed from said first end, said first end connectively disposed to a pair of wheels;
   b) a pair of pedals adjacently spaced from said second end, one of said pedals controls upward movement of the farm implements;
   c) another pedal of said pair of pedals controls downward movement of the farm implements;
   d) a movement transfer mechanism is connectively disposed between said pair of pedals and the farm implements;
   e) said upward movement lifts the farm implements via said movement transfer mechanism; and
   h) said downward movement lowers the farm implements via said movement transfer mechanism;
   i) a first elongated rod and a second elongated rod with a selected number of teeth along each end, said rods having an upper and lower portion along the longitudinal length of said rods, said first and said second elongated rods are connectively disposed within said elongated substantially rectangular member;
   j) a first cog mounted on said pedal that controls said upward movement of said farm implements, said first cog having a lower portion engaging said teeth of one of said rod's upper portion;
   k) a second cog mounted on said pedal that controls said downward movement of said farm implements, said second cog having an upper portion engaging said teeth of the other said rod's lower portion;
   l) a -C-shaped member having an upper and lower pivotal end point, said upper pivotal end point is connectively disposed to a cross bar positioned along the top portion of the movement transfer mechanism; and
   m) a third cog and a fourth cog having a bottom portion rotatively disposed on either side of said -C-shaped member's lower pivotal end, said third cog's bottom portion engages the teeth of the rod that connects to the pedal that controls said upward movement of said farm implements, said fourth cog's bottom portion engages the teeth of the rod that connects to the pedal that controls said downward movement of said farm implements; and
   whereby when the pedal that controls said upward movement of said movement transfer mechanism is urged forward said first cog engages said first rod and rotates, said first rod traverses rearward and said -C-shaped member pivots upward lifting said movement transfer mechanism, when the pedal that controls said downward movement of said movement transfer mechanism is urged forward said second cog engages said second rod and rotates, said second rod traverses forward and said -C-shaped member pivots downward lowering said movement transfer mechanism.

* * * * *